United States Patent [19]

Tachibana et al.

[11] Patent Number: 5,306,606
[45] Date of Patent: Apr. 26, 1994

[54] BIAXIALLY STRETCHED POLYESTER FILM COMPRISING A COATING LAYER CONTAINING A SALT OF A SULFONIC ACID TYPE POLYMER

[75] Inventors: Noriki Tachibana; Yoshihiro Wada; Tohru Kobayashi, all of Hino, Japan

[73] Assignee: Konica Corporation, Japan

[21] Appl. No.: 813,883

[22] Filed: Dec. 23, 1991

[30] Foreign Application Priority Data

Dec. 31, 1990 [JP] Japan .................................. 2-415951

[51] Int. Cl.$^5$ ............................................. B32B 27/06
[52] U.S. Cl. .................................... 430/533; 428/482; 428/483; 428/516; 428/520; 428/910; 430/528; 430/529; 430/535; 430/536
[58] Field of Search ............... 428/483, 516, 520, 482, 428/910; 430/529, 528, 535, 536, 533

[56] References Cited

U.S. PATENT DOCUMENTS

| | | | |
|---|---|---|---|
| 4,880,700 | 11/1989 | Charmot et al. | 428/337 |
| 4,908,277 | 3/1990 | Tsunashima et al. | 428/480 |
| 5,045,580 | 9/1991 | Kitamura | 524/147 |
| 5,079,136 | 1/1992 | Tachibana et al. | 430/529 |

*Primary Examiner*—Paul J. Thibodeau
*Assistant Examiner*—H. Thi Le
*Attorney, Agent, or Firm*—Jordan B. Bierman

[57] ABSTRACT

Disclosed is a biaxially stretched polyester film which comprises a polyester film and a coating layer composed of a resin composition comprising (A) an acrylic polymer and/or (B) a polyester copolymer and at least (C) a polymer containing a monomer having a sulfonic acid group neutralized with an organic amine in its recurring unit or (D) a polymer containing a monomer having a sulfonic acid group neutralized with ammonium on at least one surface of the polyester film.

11 Claims, No Drawings

BIAXIALLY STRETCHED POLYESTER FILM COMPRISING A COATING LAYER CONTAINING A SALT OF A SULFONIC ACID TYPE POLYMER

BACKGROUND OF THE INVENTION

1. Field of the Invention

This invention relates to a polyester film excellent in antistatic property, adhesion property and also transparency, and a light-sensitive silver halide photographic material using said polyester film.

2. Prior Art

A polyester film, particularly a polyethylene terephthalate biaxially oriented film has been used as a base for a photographic film, a base for drawing and a base for a magnetic recording tape. In these uses, a subbing layer is generally provided between a polyester support and a surface layer material to improve adhesion property therebetween. As such a subbing layer, in Japanese Patent Publication No. 40873/1972, there is disclosed a copolymer containing 8 mole % or more of a compound having a metal salt group of an ester-forming sulfonic acid based on the whole acid component and 20 mole % or more of polyethylene glycol based on the whole glycol component for the purpose of water dispersion. However, it can be easily estimated that water resistance of adhesion is lowered. In Japanese Patent Publication No. 5476/1981, a saturated linear aliphatic dicarboxylic acid having 4 to 8 methylene groups is used. However, also in this case, water resistance of the subbing layer is not sufficient. In Japanese Provisional Patent Publication No. 88454/1981, a substantially water-insoluble aqueous dispersion is used for improving water resistance. However, since the dispersion contains a water-soluble organic solvent, problems of working environment remain unsolved. In Japanese Provisional Patent Publication No. 248231/1985, there is disclosed a polyester aqueous dispersion in which a polyester having an intrinsic viscosity of 0.2 to 0.8 and substantially insoluble in water is uniformly dispersed in water containing no organic solvent. The above polyester comprises at least 40 mole % of terephthalic acid and 0.5 to 5 mole % of an aromatic dicarboxylic acid containing a metal salt of a sulfonic acid as acid components, and 5 to 60 mole % of ethylene glycol and neopentyl glycol as glycol components. In working examples thereof, the polymer insoluble in water is dissolved in tetrahydrofuran and then dispersed in water to obtain an aqueous dispersion, and then the solvent is removed by evaporation under reduced pressure, and there is also described clearly that the polymer is dissolved in a hydrophilic organic solvent such as acetone, tetrahydrofuran, ethyl acetate and methyl ethyl ketone to obtain an aqueous dispersion. Since an organic solvent is used in the process of preparing a water dispersion, problems of working environment are caused and also the steps of preparing the aqueous dispersion become complicated, whereby the above technique is not preferred in practical use.

Further, in such prior techniques, it is difficult to impart excellent transparency and antistatic property at the same time to a subbing layer. In Japanese Provisional Patent Publication No. 164831/1986, there is disclosed a technique of providing a subbing layer which is transparent, has antistatic property and also satisfies adhesion property. However, adhesion property to a hydrophilic colloid layer is poor, and a water-soluble organic solvent is contained so that there involve various problems such as problems of working environment and problems of preventing explosion of a stretching instrument and taking measures to prevent environmental pollution.

Under such a situation, in Japanese Provisional Patent Publications No. 20424/1986, No. 9242/1989 and No. 272535/1990, there have been proposed techniques of laminating a composition obtained by mixing an acrylic polymer or a polyester copolymer and a polymer having conductivity on a plastic film support. However, since compatibility of the acrylic polymer or the polyester copolymer with the conductive polymer is insufficient, there is a problem that whitening phenomenon occurs in the film obtained.

SUMMARY OF THE INVENTION

The present inventors have investigated intensively, and consequently found that said whitening phenomenon can be reduced by adding an organic amine salt or an ammonium salt as a salt of a sulfonic acid type polymer.

The present invention has been made in order to solve the above problems. That is, an object of the present invention is to provide a polyester film which comprises a coating layer composed of a resin composition comprising an acrylic polymer and/or a polyester copolymer and a sulfonic acid type polymer laminated on a polyester film support, which is excellent in coatability of an aqueous solution of said composition and adhesion property of said composition to the support.

Another object of the present invention is to provide a polyester film having excellent antistatic property, excellent in adhesion property to a hydrophilic colloid such as polyvinyl alcohol (PVA) and gelatin, particularly adhesion property under humid conditions, and also having good transparency.

Still another object of the present invention is to enable coating of a resin composition containing a completely aqueous acrylic polymer and/or a polyester copolymer and a sulfonic acid type polymer, whereby problems of working environment and problems of environmental pollution can be solved and installation can be simplified.

Still another object of the present invention is to provide a light-sensitive photographic material excellent in adhesion property between layers.

Still another object of the present invention is to obtain a polyester film showing good adhesion property also to a magnetic layer.

The objects of the present invention can be accomplished by a biaxially stretched polyester film which comprises a polyester film and a coating layer consisting essentially of a resin composition comprising (A) an acrylic polymer and/or (B) a polyester copolymer and at least (C) a polymer containing a monomer having a sulfonic acid group neutralized with an organic amine represented by the following formula (I) in its recurring unit or (D) a polymer containing a monomer having a sulfonic acid group neutralized with ammonium represented by the following formula (II) on at least one surface of the polyester film,

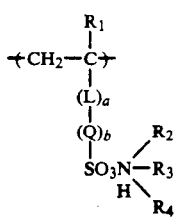

(I)

wherein $R_1$ represents hydrogen atom, a halogen atom or an alkyl group having 1 to 6 carbon atoms; $R_2$, $R_3$ and $R_4$ each represent hydrogen atom, an alkyl group having 1 to 20 carbon atoms or a hydroxyl-substituted alkyl group, and they cannot be Hs at the same time; L represents each group of —COO— or —CONH—; Q represents an alkylene group having 1 to 6 carbon atoms or a phenylene group; and a and b each represent 0 or 1,

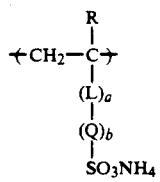

(II)

wherein R represents hydrogen atom, a halogen atom or an alkyl group having 1 to 6 carbon atoms; L represents each group of —COO— or —CONH—; Q represents an alkylene group having 1 to 6 carbon atoms or a phenylene group; a and b each represent 0 or 1; and when a=0, Q represents an alkylene group having 1 to 6 carbon atoms.

DESCRIPTION OF THE PREFERRED EMBODIMENTS

In the following, the present invention is explained in detail.

Preferred embodiments by which the effect of the present invention can be further exhibited are shown below.

The film described above comprises that the sulfonic acid type polymer contains an organic amine salt or an ammonium salt and an alkali metal salt.

The film described above comprises that said resin composition containing (A) the acrylic polymer and/or (B) the polyester copolymer and (C) or (D) the sulfonic acid type polymer contains a crosslinking agent.

The film described above comprises that (C) or (D) the sulfonic acid type polymer has a number average molecular weight of 500 to 10,000.

Further, one of the above tasks can be solved by using a light-sensitive silver halide photographic material having a hydrophilic colloid layer on the resin composition coated on the stretched polyester film described above.

The polyester copolymer constituting the resin composition of the present invention can be obtained by reacting, for example, a mixed dicarboxylic acid component and a glycol component.

The above mixed dicarboxylic acid component is preferably a dicarboxylic acid component containing 5 to 15 mole % of a dicarboxylic acid component having sulfonate group (dicarboxylic acid having sulfonate and/or an ester-forming derivative thereof) based on the whole dicarboxylic acid component in a water-soluble polyester copolymer.

As the dicarboxylic acid having sulfonate group and/or an ester-forming derivative thereof to be used in the present invention, there may be used particularly preferably those having an alkali metal salt group of sulfonic acid, for example, an alkali metal salt such as 4-sulfoisophthalic acid, 5-sulfoisophthalic acid, sulfoterephthalic acid, 4-sulfophthalic acid, 4-sulfonaphthalene-2,7-dicarboxylic acid and 5-(4-sulfophenoxy)isophthalic acid, or ester-forming derivatives thereof, and among them, sodium 5-sulfoisophthalate or an ester-forming derivative thereof is particularly preferred. These dicarboxylic acids having sulfonate group and/or ester-forming derivatives thereof are particularly preferably used in an amount of 6 to 10 mole % based on the whole dicarboxylic acid component in the points of water solubility and water resistance.

As other dicarboxylic acid components, there may be mentioned an aromatic dicarboxylic acid component and an alicyclic dicarboxylic acid component.

In the present invention, the aromatic dicarboxylic acid component is preferably used in the range of 50 to 80 mole % based on the whole dicarboxylic acid component, and further the terephthalic acid component and the isophthalic acid component are particularly preferably used, in terms of a molar ratio, in the range of 30/70 to 70/30 in the points of coatability to the polyester support and solubility in water.

As a preferred aromatic dicarboxylic acid component, there may be mentioned aromatic dicarboxylic acids such as phthalic acid, 2,5-dimethylterephthalic acid, 2,6-naphthalenedicarboxylic acid, 1,4-naphthalenedicarboxylic acid and biphenyldicarboxylic acid or ester-forming derivatives thereof.

As the alicyclic dicarboxylic acid, there may be preferably used 1,4-cyclohexanedicarboxylic acid, 1,3-cyclohexanedicarboxylic acid, 1,2-cyclohexanedicarboxylic acid, 1,3-cyclopentanedicarboxylic acid and 4,4'-bicyclohexyldicarboxylic acid or ester-forming derivatives thereof, and these compounds are preferably used in an amount of 10 mole % or more based on the whole dicarboxylic acid component in the point of viscosity of an aqueous solution of the resin.

In the present invention, the linear aliphatic dicarboxylic acid may be used in an amount within the range of 15 mole % or less based on the whole dicarboxylic acid component. As such a dicarboxylic acid component, there may be mentioned, for example, aliphatic dicarboxylic acids such as adipic acid, pimelic acid, suberic acid, azelaic acid and sebacic acid or ester-forming derivatives thereof.

In the present invention, ethylene glycol is preferably used in an amount of 50 mole % or more based on the whole glycol component in the points of mechanical characteristics of the polyester copolymer and adhesion property to the polyester support. As the glycol component to be used in the present invention, there may be used in addition to ethylene glycol, 1,4-butanediol, neopentyl glycol, 1,4-cyclohexanedimethanol, diethylene glycol, triethylene glycol and polyethylene glycol, singly or in combination.

As a polymerization method of the polyester copolymer in the present invention, there may be utilized a conventional method.

The intrinsic viscosity of the polyester copolymer to be used in the present invention is preferably in the range of 0.25 to 0.55 dl/g. The particularly preferred range of the intrinsic viscosity is 0.3 to 0.5 dl/g.

The acrylic polymer of (A) to be used in the present invention refers to copolymers obtained by copolymerizing acrylate and/or methacrylate with a monomer having an ethylenic unsaturated group which can be copolymerized with these monomers, and is a polymer containing 30 to 100 mole %, preferably 50 to 100 mole % of a recurring unit derived from acrylate and/or methacrylate.

As the copolymerizable monomer, there may be mentioned styrene, a styrene derivative, vinyl acetate, acrylonitrile, vinyl chloride and vinylidene chloride.

Further, preferred is a copolymer copolymerized with a monomer having carboxy group, methylol group, sulfinic acid group, epoxy group, chloromethyl group or vinylsulfonyl group.

The amounts of these monomers to be contained are 0 to 70 mole %, preferably 0 to 50 mole %.

The number average molecular weight of the acrylic polymer of the present invention is not particularly limited, but may be 3,000 or more, preferably 6,000 to 2,000,000.

The acrylic polymer of the present invention is used substantially in a latex state.

For making (A) the acrylic polymer a latex, there are two methods of carrying out emulsification polymerization, and dissolving a solid polymer in a low boiling point solvent and finely dispersed in water, followed by removal of the solvent. In the point that a latex containing small and uniform grains can be obtained, emulsification polymerization is preferred.

As a surfactant to be used at emulsification polymerization, there may be preferably used an anionic or nonionic surfactant in an amount of preferably 10% by weight or less based on the monomer. A large amount of the surfactant causes haze of the resin layer.

Specific examples of the acrylic polymer of the present invention are shown below.

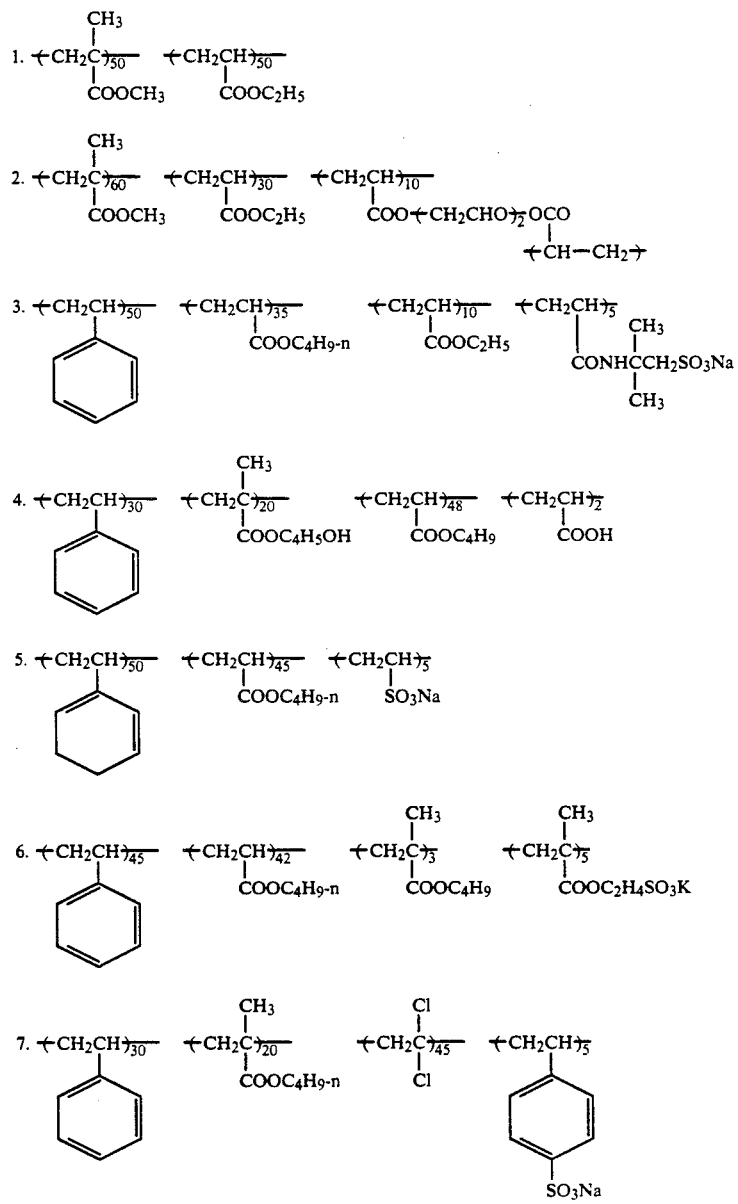

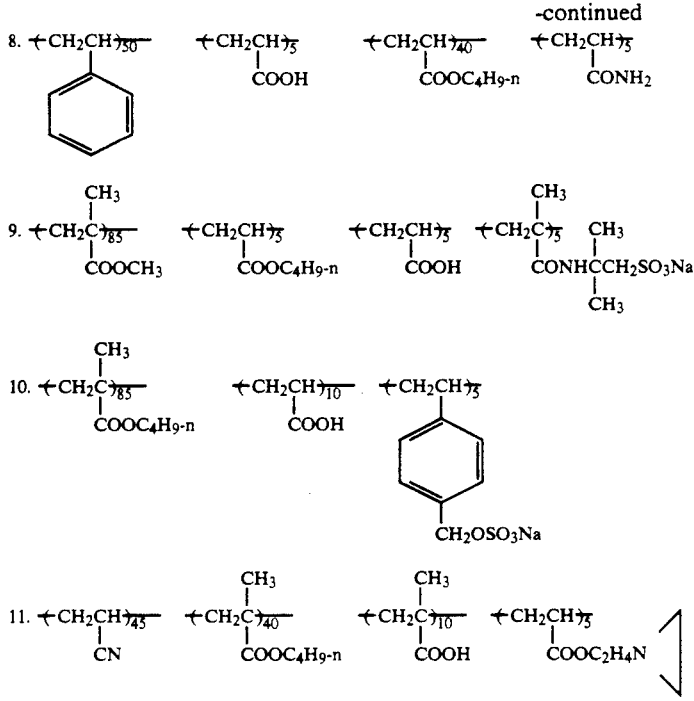

In the present invention, Mn represents an average molecular weight (in the present specification, the average molecular weight means a number average molecular weight), which is a value measured by GPC (gel permeation chromatograpy) (HLC-8020, trade name, produced by Toso Co.) and represented by calculation on sodium polystyrene sulfonate.

In the present invention, as (C) or (D) the sulfonic acid type polymer, there may be preferred those having a recurring unit of the following formula (I) or (II).

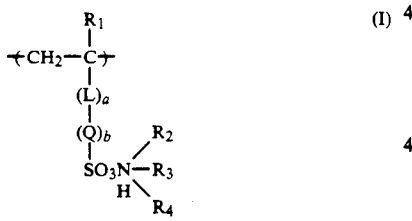

wherein $R_1$, $R_2$, $R_3$, $R_4$, L, Q, a and b each have the same meanings as those defined above,

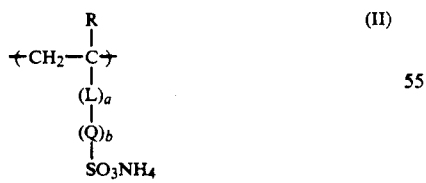

wherein R, L, Q, a and b each have the same meanings as those defined above.

As the organic amine which can be used for neutralization, there may be mentioned methylamine, ethylamine, coconut amine, caprylamine, laurylamine, stearylamine, oleylamine, dimethylamine, diethylamine, diisopropylamine, distearylamine, stearylpropylenediamine, diethanolamine, dimethyl coconut amine, dimethyllaurylamine, dimethylmyristylamine, dimethylpalmitylamine, dilaurylmonomethylamine, trimethylamine, triethylamine and trioctylamine.

Further, the organic amine may contain an alkali metal salt, and as the alkali metal salt, sodium and potassium are preferred.

The organic amine salt mentioned in the present invention means an organic amine salt neutralized with the above amine. The ammonium salt means an ammonium salt neutralized with ammonia.

The ion equivalent ratio of the organic amine salt or the ammonium salt to the alkali metal salt is 100:0 to 5:95, preferably 100:0 to 20:80.

The molecular weight of the sulfonic acid type polymer is preferably 500 to 100,000, particularly preferably 500 to 10,000.

Preferred specific examples of the recurring unit constituting (C) or (D) the sulfonic acid type polymer are shown below.

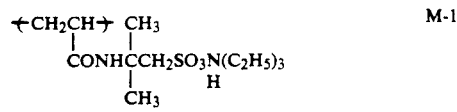

M-1

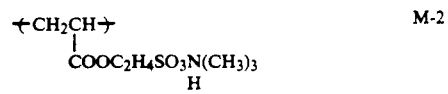

M-2

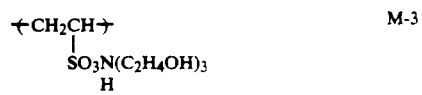

M-3

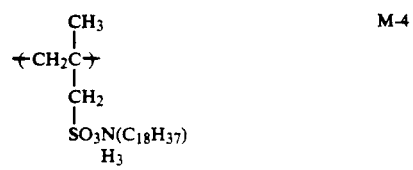

M-4

-continued

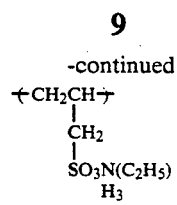 M-5

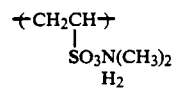 M-6

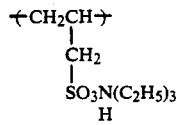 M-7

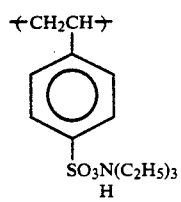 M-8

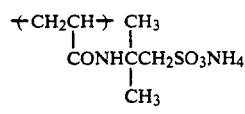 M-9

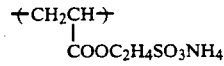 M-10

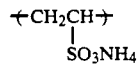 M-11

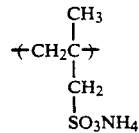 M-12

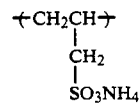 M-13

Specific examples of (C) or (D) the sulfonic acid type polymer are shown below, but the present invention is not limited to these.

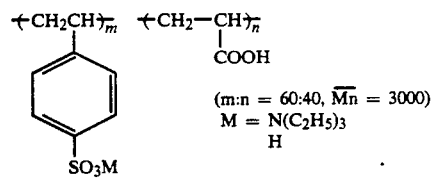 B-1

(m:n = 60:40, $\overline{Mn}$ = 3000)
M = N(C$_2$H$_5$)$_3$H

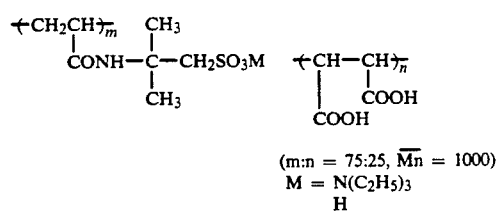 B-2

(m:n = 75:25, $\overline{Mn}$ = 1000)
M = N(C$_2$H$_5$)$_3$H

-continued

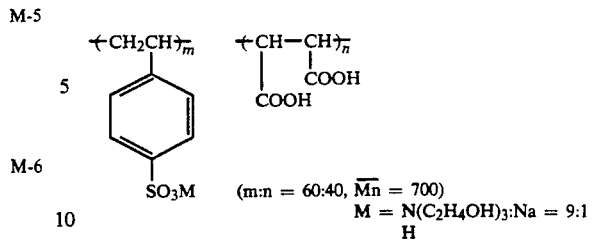 B-3

(m:n = 60:40, $\overline{Mn}$ = 700)
M = N(C$_2$H$_4$OH)$_3$:Na = 9:1
H

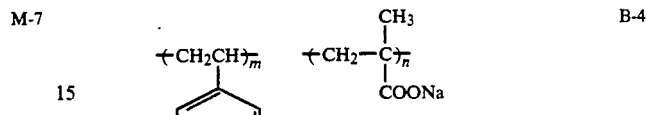 B-4

(m:n = 90:10, $\overline{Mn}$ = 4000)
M = N(C$_2$H$_5$)$_3$H

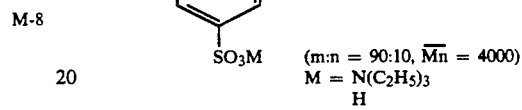 B-5

(m:n = 60:40, $\overline{Mn}$ = 2000)
M = N(C$_2$H$_5$)$_3$:Na = 95:5
H

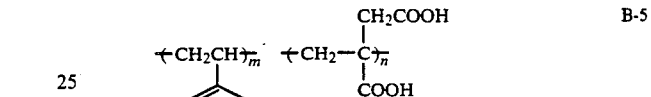 B-6

(m:n = 95:5, $\overline{Mn}$ ≈ 2000)
M = N(CH$_3$)$_3$H

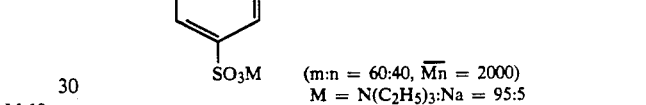 B-7

(l:m:n = 80:10:10, $\overline{Mn}$ ≈ 3000)
M = NH(CH$_3$)$_3$

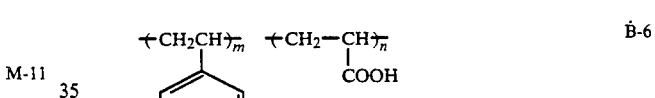 B-8

(m:n = 90:10, $\overline{Mn}$ ≈ 4500)
M = N(C$_2$H$_4$OH)$_3$H

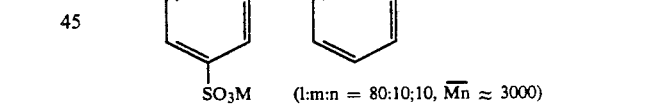 B-9

(m:n = 90:10, $\overline{Mn}$ = 4000)
M = N(C$_2$H$_5$)$_2$:Na = 90:10
H$_2$

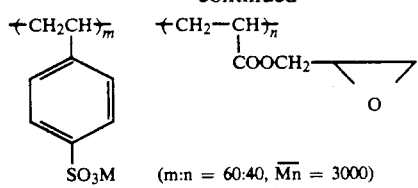

B-10

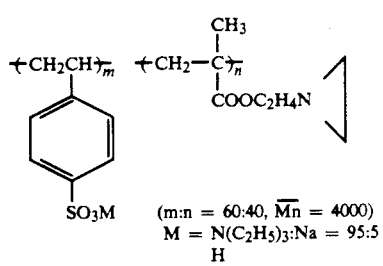

B-11

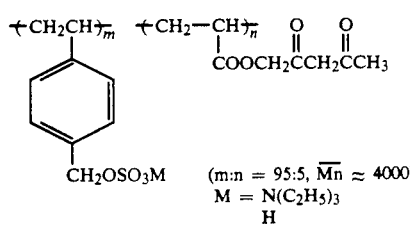

B-12

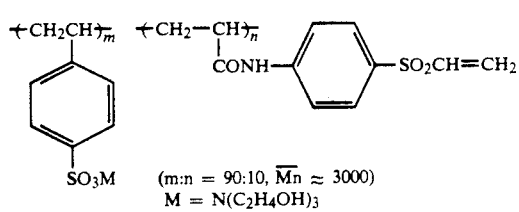

B-13

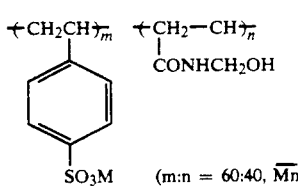

B-14

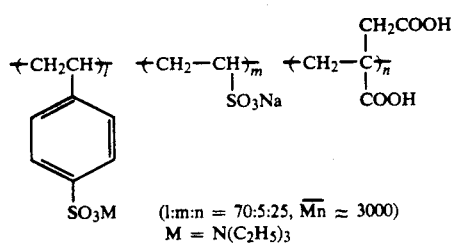

B-15

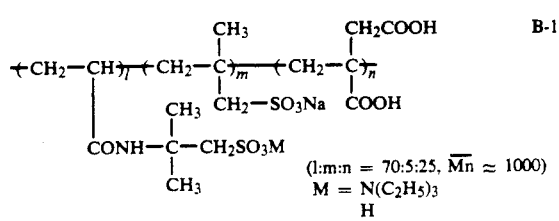

B-16

B-17

$$\text{+CH}_2\text{—CH}\text{)}_l\text{+CH}_2\text{—C}\text{)}_m\text{+CH}_2\text{—C}\text{)}_n\text{—CH}_2\text{COOH}$$
with $CH_2$, $CH_3$, $SO_3Na$, $CONHCCH_2SO_3M$, $CH_3$, $COOH$ (l:m:n = 70:5:25, $\overline{Mn} \approx 1000$)
M = N($C_2H_5$)$_3$
H

B-18

$$\text{+CH}_2\text{CH)}_m \quad \text{+CH}_2\text{—CH)}_n$$
COOC$_2$H$_4$SO$_3$NH$_4$ \quad COOH (m:n = 60:40, $\overline{Mn}$ = 3000)

B-19

$$\text{+CH}_2\text{CH)}_m \quad \text{+CH——CH)}_n$$
CH$_3$ \quad COOH  COOH
CONH—C—CH$_2$SO$_3$NH$_4$
CH$_3$ (m:n = 75:25, $\overline{Mn}$ = 1000)

B-20

$$\text{+CH}_2\text{CH)}_m \quad \text{+CH}_2\text{—C)}_n$$
SO$_3$NH$_4$ \quad COOH
CH$_2$
COOH (m:n = 60:40, $\overline{Mn}$ = 4000)

B-21

$$\text{+CH}_2\text{—CH)}_l\text{——+CH}_2\text{—C)}_m\text{——+CH}_2\text{—C)}_n$$
CH$_3$ \quad COOH
CH$_3$ \quad CH$_2$—SO$_3$Na \quad CH$_2$
CONHCCH$_2$SO$_3$NH$_4$ \quad COOH
CH$_3$ (l:m:n = 70:5:25, $\overline{Mn}$ = 1000)

B-22

$$\text{+CH}_2\text{—CH)}_l\text{+CH}_2\text{—CH)}_m\text{——+CH}_2\text{—C)}_n$$
CH$_3$ \quad CH$_2$—SO$_3$Na \quad COOH
CONHCCH$_2$SO$_3$NH$_4$ \quad CH$_2$
CH$_3$ \quad COOH (l:m:n = 70:5:25, $\overline{Mn}$ = 1000)

In the present invention, a crosslinking agent is preferably contained in the resin composition.

As the crosslinking agent to be used in the present invention, there may be mentioned an epoxy compound, an aziridine compound, a block methylol compound, a block isocyanate compound and a vinyl sulfone compound, preferably an epoxy compound or an aziridine compound.

The epoxy compound may be any compound having an epoxy group and not particularly limited, but preferably a compound having two or more functionals of epoxy groups.

Representative specific examples of the water-soluble epoxy compound are shown below.

C-I Sorbitol polyglycidyl ether
C-II Sorbitan polyglycidyl ether
C-III Polyglycerol polyglycidyl ether
C-IV Diglycerol polyglycidyl ether
C-V Glycerol polyglycidyl ether
C-VI Ethylene glycol diglycidyl ether
C-VII Polyethylene glycol diglycidyl ether
C-VIII Propylene glycol diglycidyl ether
C-IX Polypropylene glycol diglycidyl ether As a commercially available product, there may be mentioned Denacol series products (trade name, produced by Nagase Kasei Kogyo K.K.), specifically Denacol EX-614B, EX-651A, EX-512, EX-521, EX-421, EX-313, EX-830, EX-841, EX-861, EX-911 and EX-920 (all trade names), which are not limitative.

Two or more of the above epoxy compounds may be used in combination.

As the aziridine compound, there may be preferably used those having two or more functionals, particularly preferably those having two functionals or three functionals with a molecular weight of 1,000 or less.

Representative specific examples of the aziridine compound are shown below.

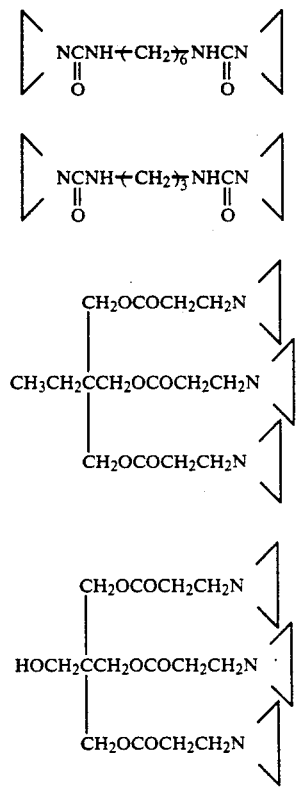

The above resin composition preferably contains (A) the acrylic polymer and/or (B) the polyester copolymer and (C) or (D) the sulfonic acid type polymer and a crosslinking agent, if necessary at a ratio of (5 to 95% by weight):(95 to 5% by weight):(40 to 0% by weight).

To the coating solution containing the above resin composition, a matting agent may be added, and further a water-soluble or water-dispersible polymer other than the acrylic polymer, polyester copolymer and sulfonic acid type polymer according to the present invention may be added within the range which does not impair the effect of the present invention.

As the polyester film to be used in the present invention, there may be mentioned a polyester film comprising a linear saturated polyester synthesized from aromatic dibasic acid or an ester-forming derivative thereof and diol or an ester-forming derivative thereof. Specific examples of such a polyester may include polyethylene terephthalate, polyethylene isophthalate and polybutylene terephthalate, and also copolymers of these and polyesters obtained by blending small amounts of other resins. Further, a polyester containing a white pigment such as titanium oxide and barium sulfate kneaded therein may be included.

For coating the subbing layer coating solution on the polyester film, a conventional coating process can be used. However, from the standpoint of cost, a method in which the subbing layer coating solution is coated in the steps for preparing the polyester film is preferred. The subbing layer coating solution is particularly preferably coated on at least one surface of the polyester film at any time before completion of orientation and crystallization during the process as described above, and as one example thereof, there may be mentioned a method in which an unstretched film obtained by cooling a thermoplastic resin melt extruded to have a film shape from a die on a cooling drum is preheated and then stretched longitudinally, the subbing layer coating solution is coated on the film and then dried, the film is further preheated and then stretched laterally, and the film is fixed by heat. Before coating the subbing layer coating solution, a surface treatment such as corona discharging and glow discharging may be carried out.

In general, it has been thought that when a material coated with a sulfonic acid type polymer is stretched, moisture is required to exist in a polymer coating film or in atmosphere during stretching step, which is described in, for example, Japanese Provisional Patent Publications No. 2/1989 and No. 287142/1989.

However, it is extremely difficult to control moisture in the polymer-coated film, and for bringing moisture in the stretching step, a pressure steam instrument should be equipped, whereby serious problems of cost and maintenance of a prepared layer are caused. The sulfonic acid type polymer of the present invention can be stretched under low humidity, i.e. a relative humidity of 25% or lower, by which these drawbacks can be solved.

By controlling the amount of the organic amine salt or ammonium salt and the amount of the alkali metal salt, a transparent coated film in conformity with stretching rate can be prepared.

In the present invention, the polyester film before completion of orientation and crystallization is an unstretched film obtained by hot melting a polyester polymer and making it a film as such, a uniaxially stretched film obtained by stretching the unstretched film in either longitudinal or lateral direction, or a film obtained by biaxially stretching the unstretched film in longitudinal and lateral directions, and refers to a biaxially stretched film before re-stretching in either longitudinal or lateral direction and completion of orientation and crystallization.

The above longitudinal stretching and lateral stretching are generally carried out with a rate of 2.0 to 5.0-fold, preferably 2.5 to 4.0-fold.

The concentration of the above subbing layer coating solution is generally 15% by weight or less, preferably 10 by weight or less. The amount to be coated is 1 to 20 g, preferably 5 to 15 g per 1 m² of the film in terms of weight of the coating solution.

As a coating method, there may be used suitably various known methods.

The polyester film before completion of orientation and crystallization coated as described above is dried, and then the steps such as stretching and heat fixing are carried out. The polyester film having the subbing layer thus provided on the support shows excellent adhesion property to a hydrophilic colloid such as polyvinyl alcohol and gelatin, and also excellent water resistance.

In the present invention, various films can be prepared by providing at least one hydrophilic colloid layer on the above subbing layer. For example, there may be mentioned a light-sensitive photographic material having at least one silver halide emulsion layer provided above the subbing layer containing the resin composition according to the present invention relative to the support. Further, it is also possible to provide a layer containing a binder such as a magnetic layer in place of a hydrophilic colloid layer.

As the hydrophilic colloid to be used in the above hydrophilic colloid layer, there may used conventional ones.

In the light-sensitive photographic material of the present invention, as a silver halide emulsion to be used in at least one silver halide emulsion layer provided on or over the subbing layer, there may be used various common silver halide emulsions as desired.

The film strengths of the silver halide emulsion layer and other hydrophilic colloid layers can be enhanced by using a hardener. As such a hardener, there may be used aldehyde type, aziridine type, isoxazole type, epoxy type, vinyl sulfone type, acryloyl type, carbodiimide type, triazine type, polymer type, maleimide type, acetylene type and methanesulfonate type hardeners singly or in combination, respectively.

The present invention can be applied to various light-sensitive photographic materials such as an X ray-sensitive material, a light-sensitive printing material, a light-sensitive material for photography and a light-sensitive material for observation.

EXAMPLES The present invention is described in detail by referring to examples.

The obtained resin compositions, polyester film supports and polyester films having a subbing layer were measured, and evaluated according the following standards.

(1) Viscosity of coating solution: The respective subbing layer coating solutions prepared were measured at 20° C.

(2) Coatability: The respective subbing layer coating solutions prepared were coated on polyethylene terephthalate supports previously uniaxially stretched with a wire bar so as to give a predetermined coated film thickness. Each coated state at that time was evaluated with visual observation. The evaluation standards are shown below.

○: Uniform coating without unevenness
Δ: Slight uneven coating
×: No uniform coating (3) Adhesion property to support: The unstretched film (thickness: 1,000 μm) obtained by melt extruding polyethylene terephthalate having an intrinsic viscosity of 0.65 from a T die at 280 C to have a film shape, applying static electricity thereto and quenching it on a cooling drum at about 30° C. was preheated to 75° C. and stretched longitudinally (3-fold), followed by corona discharging. After the subbing layer coating solution was coated on the surface of said treated support, the support was dried and preheated in a tenter. Subsequently, the support was stretched laterally (3.5-fold) at 100° C. and heat fixed at 220° C. to obtain a biaxially stretched polyethylene terephthalate film subbing-treated to have a film thickness of 0.3 g/m² (calculated on polymer).

On the subbing layer surface of the polyethylene terephthalate film, a cut of 45° was made in checked form with a razor. A cellophane adhesive tape was contact bonded to the cut and peeled off abruptly. The peeled-off area of the subbing layer was evaluated by using 5 ranks.

(4) Adhesion property to gelatin: On the polyethylene terephthalate film having the subbing layer provided thereon obtained in (3) was coated a gelatin layer containing a hardener, and the film was dried and hardened. In the same manner as in (3), a cut of 45° was made, and a cellophane adhesive tape was contact bonded thereto and peeled off abruptly. The peeled-off area of the gelatin layer was evaluated by using 5 ranks.

(5) Water resistance of adhesion: The film obtained in (4) was dipped in an aqueous potassium hydroxide solution having a pH of 10.2 at 35° C. for 15 seconds. On the surface of the film, a cut was made with a pen point, and the portion was rubbed strongly. The peeled-off area of the gelatin layer was evaluated by using 5 ranks.

The standards of the 5 rank evaluation showing the adhesion properties and the water resistance of adhesion are shown below.

| | |
|---|---|
| 1 | Adhesive force is extremely weak, and the whole area is peeled off. |
| 2 | 50% or more is peeled off. |
| 3 | About 10 to 50% is peeled off. |
| 4 | Adhesive force is fairly strong, and only less than 10% is peeled off. |
| 5 | Adhesive force is extremely strong, and no peel-off occurs at all. |

If the evaluation is 4 or 5, the adhesion property is considered to be sufficient in practical use.

(6) Surface intrinsic resistance: The surface intrinsic resistance of the film obtained in (3) was measured by using Teraohm meter VE-30 (trade name) manufactured by Kawaguchi Denki K. K. under the conditions of an applied voltage of 100 V, at 23° C. and a relative humidity of 55%.

(7) Stretchability: The stretchability of the film obtained in (3) was evaluated by measuring a haze by TURBIDIMETER MODEL T-2600DA (trade name) manufactured by Tokyo Denshokusha.

EXAMPLE 1

Transesterification of a mixture comprising 38.74 parts by weight of dimethyl terephthalate, 31.95 parts by weight of dimethyl isophthalate, 10.34 parts by weight of dimethyl 5-sulfoisophthalate sodium salt, 54.48 parts by weight of ethylene glycol, 0.073 part by weight of calcium acetatemonohydrate and 0.024 part by weight of manganese acetate tetrahydrate was carried out at 170° to 220° C. under nitrogen gas stream while removing methanol. To the reaction mixture were added 0.05 part by weight of trimethyl phosphate, and 0.04 part by weight of antimony trioxide as a polycondensation catalyst and 17.17 parts by weight of 1,4-cyclohexanedicarboxylic acid, and the mixture was esterified at a reaction temperature of 220° to 235° C. while removing an about theoretical amount of water. Subsequently, the pressure was reduced to 0.2 mmHg and at the same time, the temperature was elevated to 280° C. The polycondensation reaction was carried out for 2 hours.

When the resulting polyester copolymer (A) was analyzed, the intrinsic viscosity was found to be 0.45 dl/g. Said polyester copolymer was stirred in hot water of 95 C for 3 hours to prepare an aqueous 15% by weight solution.

By using 85% by weight of the aqueous solution of the polyester copolymer (A) and 15% by weight of the sulfonic acid type polymer (B-2) as mentioned above based on the total weight of (A) and (B-2), an aqueous solution was so prepared that the total solid weight of (A) and (B-2) was 8 % by weight to obtain a subbing layer coating solution. The subbing layer coating solution obtained was coated on the longitudinally stretched polyethylene terephthalate film support to prepare a biaxially stretched polyethylene terephthalate film having a subbing layer with a dried weight of 0.3 g/m². Further, a film was prepared by laminating gelatin on said film having the subbing layer according to a conventional manner. For these films, the adhesion and other properties described above were evaluated (Table 1).

EXAMPLES 2 AND 3

The procedures were carried out in the same manner as in Example 1 except for using the aqueous solution of the polyester copolymer (A) and the sulfonic acid type polymer (B-2) used in Example 1, and the following epoxy compound (C-1) at a ratio as shown in Table 1, respectively, to prepare biaxially stretched polyethylene terephthalate films each having a subbing layer and films laminated with gelatin.

Epoxy compound (C-1)

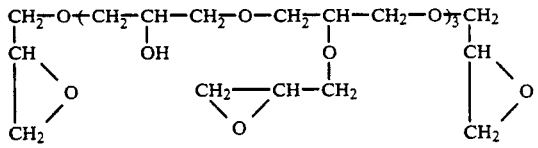

The films obtained were evaluated in the same manner as in Example 1 (Table 1).

EXAMPLE 4

The procedures were carried out in the same manner as in Example 2 except for changing the polyester copolymer in Example 2 to the acrylic polymer (1) and using the respective compounds at a ratio shown in Table 1 to prepare a biaxially stretched polyethylene terephthalate film having a subbing layer and a film laminated with gelatin.

The films obtained were evaluated in the same manner as in Example 2 (Table 1).

EXAMPLE 5

The procedures were carried out in the same manner as in Example 2 except for changing the sulfonic acid type polymer (B-2) in Example 2 to (B-17) to prepare a biaxially stretched polyethylene terephthalate film having a subbing layer and a film laminated with gelatin.

The films obtained were evaluated in the same manner as in Example 2 (Table 1).

EXAMPLE 6

The procedures were carried out in the same manner as in Example 2 except for changing the acrylic polymer to (4) and the epoxy compound (C-1) to C-XII, respectively, to prepare a biaxially stretched polyethylene terephthalate film having a subbing layer and a film laminated with gelatin.

The films obtained were evaluated in the same manner as in Example 2 (Table 1).

EXAMPLE 7

The procedures were carried out in the same manner as in Example 2 except for changing the weight ratio of the acrylic polymer (4) to the polyester copolymer (A) to 1/1 to prepare a biaxially stretched polyethylene terephthalate film having a subbing layer and a film laminated with gelatin.

The films obtained were evaluated in the same manner as in Example 2 (Table 1).

EXAMPLE 8

The procedures were carried out in the same manner as in Example 1 except for changing the sulfonic acid type polymer (B-2) used in Example 1 to (B-19) to prepare a biaxially stretched polyethylene terephthalate film having a subbing layer and a film laminated with gelatin.

The films obtained were evaluated in the same manner as in Example 1 (Table 1).

EXAMPLES 9 and 10

The procedures were carried out in the same manner as in Example 1 except for using the aqueous solution of the polyester copolymer (A) used in Example 1 and the sulfonic acid type polymer (B-19), and the epoxy compound (C-1) used in Examples 2 and 3 at a ratio as shown in Table 1, respectively, to prepare biaxially stretched polyethylene terephthalate films each having a subbing layer and films laminated with gelatin.

The films obtained were evaluated in the same manner as in Example 1 (Table 1).

EXAMPLE 11

The procedures were carried out in the same manner as in Example 9 except for changing the polyester copolymer in Example 9 to the acrylic polymer (1) and using the respective compounds at a ratio shown in Table 1 to prepare a biaxially stretched polyethylene terephthalate film having a subbing layer and a film laminated with gelatin.

The films obtained were evaluated in the same manner as in Example 1 (Table 1).

EXAMPLE 12

The procedures were carried out in the same manner as in Example 9 except for changing the sulfonic acid type polymer (B-19) in Example 9 to (B-22) to prepare a biaxially stretched polyethylene terephthalate film having a subbing layer and a film laminated with gelatin.

The films obtained were evaluated in the same manner as in Example 1 (Table 1).

EXAMPLE 13

The procedures were carried out in the same manner as in Example 9 except for changing the acrylic polymer in Example 9 to (4) and the epoxy compound (C-1) to C-XII to prepare a biaxially stretched polyethylene terephthalate film having a subbing layer and a film laminated with gelatin.

The films obtained were evaluated in the same manner as in Example 1 (Table 1).

EXAMPLE 14

The procedures were carried out in the same manner as in Example 9 except for changing the weight ratio of the acrylic polymer (4) and the polyester copolymer A to 1/1 to prepare a biaxially stretched polyethylene terephthalate film having a subbing layer and a film laminated with gelatin.

The films obtained were evaluated in the same manner as in Example 1 (Table 1).

COMPARATIVE EXAMPLES 1 AND 2

The procedures were carried out in the same manner as in Example 1 except for changing all the sulfonic acid type polymers (B-2) in Example 1 to sodium salts to prepare biaxially stretched polyethylene terephthalate films each having a subbing layer and films laminated with gelatin.

The films obtained were evaluated in the same manner as in Example 1 (Table 1).

COMPARATIVE EXAMPLE 3

The procedures were carried out in the same manner as in Example 2 except for changing the sulfonic acid type polymer (B-2) in Example 2 to a sodium salt of (B-2) comprising the same constitutional unit and having a number average molecular weight of 20,000 to prepare a biaxially stretched polyethylene terephthalate film having a subbing layer and a film laminated with gelatin.

The films obtained were evaluated in the same manner as in Example 1 (Table 1).

COMPARATIVE EXAMPLE 4

The procedures were carried out in the same manner as in 5 Example 4 except for changing (B-2) in Example 4 to a sodium salt of (B-2) comprising the same constitutional unit and having a number average molecular weight of 20,000 to prepare a biaxially stretched polyethylene terephthalate film having a subbing layer and a film laminated with gelatin (Table 1).

TABLE 1

| Item | Example No. 1 | 2 | 3 | 4 | 5 | 6 | 7 | 8 | 9 |
|---|---|---|---|---|---|---|---|---|---|
| Acrylic and/or polyester copolymer | A | A | A | (1) | A | (4) | A + (4) | A | A |
| Copolymer content (% by weight) | 85 | 81 | 55 | 90 | 81 | 81 | 81 1/1 | 85 | 81 |
| Sulfonic acid type polymer | | | | | | | | | |
| Kind | B-2 | B-2 | B-2 | B-2 | B-17 | B-2 | B-17 | B-19 | B-19 |
| % by weight | 15 | 15 | 25 | 9 | 15 | 15 | 15 | 15 | 15 |
| Crosslinking agent | | | | | | | | | |
| Kind | — | C-1 | C-1 | C-1 | C-1 | C-XII | C-1 | — | C-1 |
| % by weight | — | 4 | 10 | 1 | 4 | 4 | 4 | — | 4 |
| Viscosity of coating solution (Cp) | 4.5 | 6.0 | 7.5 | 3.8 | 5.5 | 4.9 | 5.5 | 2.8 | 3.3 |
| Coatability | ○ | ○ | ○ | ○ | ○ | ○ | ○ | ○ | ○ |
| Adhesion property to support | 4 | 5 | 4 | 5 | 5 | 5 | 4 | 4 | 5 |
| Adhesion property to gelatin | 4 | 5 | 5 | 4 | 5 | 4 | 5 | 4 | 5 |
| Water resistance of adhesion | 4 | 4 | 5 | 4 | 4 | 4 | 4 | 4 | 4 |
| Surface intrinsic viscosity (Ω) | $4.2 \times 10^9$ | $7.2 \times 10^9$ | $1.5 \times 10^{10}$ | $8.5 \times 10^{10}$ | $1.3 \times 10^{10}$ | $1.4 \times 10^{10}$ | $1.6 \times 10^{10}$ | $1.4 \times 10^9$ | $2.4 \times 10^9$ |
| Stretchability (%) | 0.9 | 1.1 | 1.4 | 1.2 | 1.3 | 1.3 | 1.2 | 1.4 | 1.5 |

| Item | Example No. 10 | 11 | 12 | 13 | 14 | Comparative example No. 1 | 2 | 3 | 4 |
|---|---|---|---|---|---|---|---|---|---|
| Acrylic or/and polyester copolymer | A | (1) | A | (4) | A + (4) | A | A | A | (1) |
| Copolymer content (% by weight) | 55 | 90 | 81 | 81 | 81 1/1 | 85 | 85 | 81 | 90 |
| Sulfonic acid type polymer | | | | | | | | | |
| Kind | B-19 | B-19 | B-22 | B-19 | B-22 | B-2 Na | B-2 Na | B-2 Na | B-2 Na |
| % by weight | 25 | 9 | 15 | 15 | 15 | 15 | 11 | 15 | 9 |
| Crosslinking agent | | | | | | | | | |
| Kind | C-1 | C-1 | C-1 | C-XII | C-1 | — | C-1 | C-1 | C-1 |
| % by weight | 10 | 1 | 4 | 4 | 4 | — | 4 | 4 | 1 |
| Viscosity of coating solution (Cp) | 4.0 | 2.0 | 3.0 | 3.5 | 3.5 | 5.1 | 3.9 | 3.8 | 2.0 |
| Coatability | ○ | ○ | ○ | ○ | ○ | ○ | △ | ○ | ○ |
| Adhesion property to support | 4 | 5 | 5 | 5 | 4 | 3 | 4 | 5 | 5 |
| Adhesion property to gelatin | 5 | 4 | 5 | 4 | 5 | 3 | 4 | 5 | 4 |
| Water resistance of adhesion | 5 | 4 | 4 | 4 | 4 | 3 | 4 | 4 | 4 |
| Surface intrinsic viscosity (Ω) | $5.2 \times 10^9$ | $4.0 \times 10^{10}$ | $3.6 \times 10^9$ | $4.5 \times 10^9$ | $5.5 \times 10^9$ | $2.0 \times 10^{14}$ | $5.4 \times 10^9$ | $2.4 \times 10^{11}$ | $1.0 \times 10^{11}$ |
| Stretchability (%) | 1.8 | 1.3 | 1.6 | 1.5 | 1.5 | 3.2 | 6.6 | 20 | 20 |

EXAMPLE 15

On a biaxially stretched polyethylene terephthalate film having a subbing layer obtained by coating a subbing layer coating solution on a longitudinally stretched support in entirely the same manner as in Example 1, a light-sensitive layer for X ray photography was provided by coating according to a conventional method to obtain a light-sensitive material sample. For the light-sensitive material sample obtained, film adhesion in a dry state before development processing (hereinafter called to "adhesion before development"), wet adhesion during development processing and film adhesion in a dry state after development processing (hereinafter called to "dry adhesion") were measured by the following method, respectively, and the adhesion property between layers were evaluated. Further, the transparency was evaluated (Table 2).

Method of Evaluating Film Adhesion

Adhesion before development and dry adhesion

EXAMPLES 16 TO 28

Light-sensitive material samples were prepared in the same manner as in Example 15 except for changing each subbing layer coating solution containing the resin composition as shown in Table 2, and evaluated in the same manner as in Example 15 (Table 2).

COMPARATIVE EXAMPLE 5

A light-sensitive material sample was prepared in the same manner as in Example 15 except for changing the subbing layer coating solution containing the resin composition as shown in Table 2, and evaluated in the same manner as in Example 15 (Table 2).

TABLE 2

| Item | Example 15 | 16 | 17 | 18 | 19 | 20 | 21 | 22 |
|---|---|---|---|---|---|---|---|---|
| Subbing layer coating solution | Same as in Example 1 | Same as in Example 2 | Same as in Example 3 | Same as in Example 4 | Same as in Example 5 | Same as in Example 6 | Same as in Example 7 | Same as in Example 8 |
| Adhesion before development | 4 | 5 | 5 | 4 | 5 | 4 | 5 | 4 |
| Wet adhesion | 4 | 4 | 5 | 4 | 4 | 4 | 4 | 4 |
| Dry adhesion | 5 | 5 | 5 | 5 | 5 | 5 | 5 | 5 |
| Haze | 1.8 | 2.0 | 2.3 | 2.1 | 2.2 | 2.2 | 2.1 | 2.3 |

| Item | Example 23 | 24 | 25 | 26 | 27 | 28 | Comparative example 5 |
|---|---|---|---|---|---|---|---|
| Subbing layer coating solution | Same as in Example 9 | Same as in Example 10 | Same as in Example 11 | Same as in Example 12 | Same as in Example 13 | Same as in Example 14 | Same as in Comparative example 3 |
| Adhesion before development | 5 | 5 | 4 | 5 | 4 | 5 | 5 |
| Wet adhesion | 4 | 5 | 4 | 4 | 4 | 4 | 4 |
| Dry adhesion | 5 | 5 | 5 | 5 | 5 | 5 | 4 |
| Haze | 2.1 | 2.0 | 2.3 | 2.2 | 2.0 | 2.0 | 10.0 |

Before development processing or after development processing, on the surface of a hydrophilic colloid layer for photography of the sample dried completely, cuts reaching the support were made in checked form with a razor at an angle of 45°. After an adhesive tape (cellophane adhesive tape) was contact bonded to the colloid layer, said tape was peeled off abruptly at an angle of about 45°. The area of the hydrophilic layer for photography peeled-off with the tape and the area to which the tape was contact bonded were compared to evaluate the film adhesions by using the following 5 ranks.

| Evaluation | 5 | 4 | 3 | 2 | 1 |
|---|---|---|---|---|---|
| State of peel-off | No peel-off | 0 to 20% | 21 to 50% | 51 to 100% | 101% or more |

If the evaluation is 4 or 5, the film adhesion is considered to be sufficiently strong in pracitcal use.

Wet adhesion

During various development processings, on the surface of a hydrophylic colloid layer for photography of the sample, cuts reaching the support were made in checked form with a sharp needle, and then the surface of said layer in a wet state was rubbed strongly each time for 10 seconds. The area of the hydrophilic colloid layer for photography peeled off and the checked cut area were compared to evaluate the film adhesion by using 5 ranks. The evaluation standards were the same as those in the original and dry adhesions.

As clearly seen from Table 2, it can be understood that the light-sensitive material samples for X ray photography having the subbing layer containing the polyester resin composition according to the present invention were excellent in all of the adhesion before development, wet adhesion and dry adhesion, particularly excellent in transparency and dry adhesion.

The above effect could be obtained similarly not only in light-sensitive materials for X ray photography but also in light-sensitive materials for various photographies (light-sensitive materials containing color emulsions and emulsions for light-sensitive printing materials).

According to the present invention, the following effects can be obtained.

(1) Since the resin composition used in the present invention can be used in a completely aqueous system, there are no problem in working environment such as toxicity and flammability, and in environmental pollution, whereby installation can be simplified as compared with the case where an organic solvent is used.

(2) The polyester film laminated with the subbing layers containing the resin composition used in the present invention is transparent and excellent in antistatic property and adhesion property to a hydrophilic colloid layer, and also shows adhesion property having good water resistance.

(3) Since the resin composition used in the present invention has appropriate viscosity as an aqueous solution, it shows particularly excellent effect when a polyester film support before completion of orientation and crystallization is to be coated.

We claim:

1. A biaxially stretched polyester film which comprises a polyester film and a coating layer composed of a resin composition comprising:

at least one of (A) an acrylic polymer and (B) a ester copolymer and at least one of (C) a polymer containing a monomer having a sulfonic acid group neutralized with an organic amine represented by the following formula (I) in its recurring unit and (D) a polymer containing a monomer having a sulfonic acid group neutralized with ammonium represented by the following formula (II) on at least one surface of the polyester film,

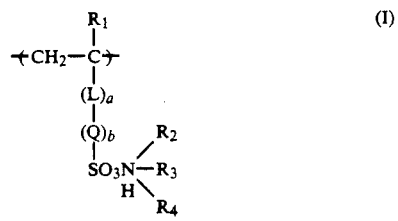

(I)

wherein $R_1$ represents hydrogen atom, a halogen atom or an alkyl group having 1 to 6 carbon atoms; $R_2$, $R_3$ and $R_4$ each represent hydrogen atom, an alkyl group having 1 to 20 carbon atoms or a hydroxyl-substituted alkyl group, and they can not be Hs at the same time; L represents —COO— or —CONH—; Q represents an alkylene group having 1 to 6 carbon atoms or a phenylene group; and a and b each represent 0 or 1,

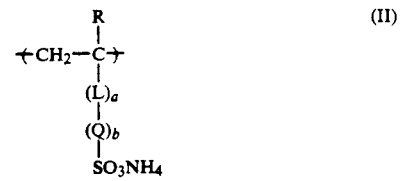

(II)

wherein R represents hydrogen atom, a halogen atom or an alkyl group having 1 to 6 carbon atoms; L represents —COO— or —CONH—; Q represents an alkylene group having 1 to 6 carbon atoms or a phenylene group; a and b each represent 0 or 1; and when a=0, Q represents an alkylene group having 1 to 6 carbon atoms.

2. The film of claim 1 wherein polymer (C) or (D) contains (1) an organic amine salt, an ammonium salt, or a mixture thereof and (2) an alkali metal salt.

3. The film of claim 2 wherein the organic amine salt and the ammonium salt are contained in amounts of 100:0 to 5:95 in terms of an ion equivalent ratio.

4. The film of claim 1 wherein said resin composition further contains a crosslinking agent.

5. The film of claim 4 wherein said resin composition contains (1) acrylic polymer (A) or a polyester copolymer (B), (2) either polymer (C) or polymer (D), and (3) a crosslinking agent, in a ratio (1:2:3) of (5% to 95%):(95% to 5%):(40% to 0%), all percents being by weight.

6. The film of claim 1 wherein polymer (C) or (D) has a number average molecular weight of 500 to 10,000.

7. The film of claim 1 wherein said acrylic polymer has an average molecular weight of 6,000 to 2,000,000.

8. The film of claim 1 wherein said polyester copolymer has an intrinsic viscosity of 0.25 to 0.55 dl/g.

9. The film of claim 1 wherein the film is stretched biaxially by a factor of 2.0 to 5.0, both longitudinally and laterally.

10. The film of claim 1 wherein the film is stretched under a relative humidity of 25% or less.

11. A light-sensitive silver halide photographic material using the film according to claim 1 as a support.

* * * * *